United States Patent [19]
Koppang

[11] Patent Number: 5,823,124
[45] Date of Patent: Oct. 20, 1998

[54] METHOD AND SYSTEM TO REDUCED $NO_x$ AND FUEL EMISSIONS FROM A FURNACE

[75] Inventor: Richard R. Koppang, Monarch Beach, Calif.

[73] Assignee: Gas Research Institute, Chicago, Ill.

[21] Appl. No.: 552,993

[22] Filed: Nov. 3, 1995

[51] Int. Cl.⁶ ..................................................... F23J 11/00
[52] U.S. Cl. ........................... 110/345; 432/72; 432/180; 431/5; 110/214; 110/212
[58] Field of Search ..................................... 110/210, 212, 110/214, 345; 432/72, 179–181; 431/5, 10; 65/134.6; 423/235

[56] References Cited

U.S. PATENT DOCUMENTS

| | | | |
|---|---|---|---|
| 4,328,020 | 5/1982 | Hughes | 432/180 X |
| 4,347,072 | 8/1982 | Nagaoka et al. | 65/27 |
| 4,372,770 | 2/1983 | Krumwiede et al. | 65/27 |
| 4,599,100 | 7/1986 | Demarest, Jr. | 65/134 |
| 4,909,727 | 3/1990 | Khinkis | 431/10 |
| 5,203,859 | 4/1993 | Khinkis et al. | 432/30 |
| 5,238,396 | 8/1993 | Yap | 431/10 |
| 5,573,568 | 11/1996 | Quirk et al. | 65/134.6 |

FOREIGN PATENT DOCUMENTS

| | | | |
|---|---|---|---|
| 0599548A1 | 11/1993 | European Pat. Off. | C03B 5/235 |
| 2226122 | 6/1990 | United Kingdom | 110/214 |

OTHER PUBLICATIONS

Pulse Combustion:Impinging Jet Heat Transfer Enhancement *Combust. Sci. and Tech.*, 1993, pp. 147–165.
Measurement of the Optical Properties of Coal–Derived and Propane–Derived Soot in a Flat Flame Reactor; J. Rigby and B. Webb, Mech. Eng. Dept., Brigham Young Univ. and T. Fletcher, Chem. Eng. Dept., Brigham Y. U.
Heat Transfer Optimization in TV Glass Furnaces;pp. 141–151; W. J. Horan, Techneglas, Inc. and A.G. Slavejkov and L.L. Chang, Air Products and Chemicals, Inc.
Flue Gas Heat Recover in Glass Furnaces, Reprinted From *Glass*, Nov. 1983, P. Bony.
Thermal Performance of Cruciform Regenerator Packings, Reprinted from *Glass*, Mar., 1990, A. Zanoli, E.R. Begley, R. Videl and D. Lagarenne.
The Influence of the Thermal Properties of Refractories and Their Mode of Utilisation on the Heat Balance in Regenerators, Glass Technology, vol. 21, No. 4, Aug., 1980, J. Delrieux.
"Oxygen Enriched Air/Natural Gas Burner System Development," Final Report (Jul. 1984–Sep. 1989), Gas Research Institute, Chicago, IL.
Phillips et al., "Use of Air/Oxy/Fuel Burners for Aluminum Dross Processing," Industrial Heating, Mar. 1993, pp. 65–69.

*Primary Examiner*—Henry A. Bennett
*Assistant Examiner*—Susanne C. Tinker
*Attorney, Agent, or Firm*—Thomas, Kayden, Horstemeyer & Risley, LLP

[57] ABSTRACT

A system of this invention reduces the emission of $NO_x$ and fuel pollutants from a furnace. The system includes a furnace with a chamber for combusting air, oxygen and fuel flows in an approximately stoichiometric proportion. A reburn unit, that can be a port, is coupled to communicate with and receive the combustion exhaust from the chamber. The reburn unit is also coupled to receive a second fuel flow that is added to the exhaust flow at a stoichiometric ratio and temperature at which a reaction occurs to lower the amount of $NO_x$ in the exhaust flow. The reburn unit is coupled to a burnout unit that can be a regenerator or a recuperator, that is coupled to receive an oxidant flow with air and/or oxygen. The oxidant flow combusts fuel in the exhaust flow to prevent emission of this fuel into the atmosphere. To cool the exhaust from the regenerator or recuperator so that it is not reactive, a conduit in which the exhaust flows from the burnout unit can be coupled to receive a coolant flow of air and/or oxygen. A stack or flue is coupled to receive the exhaust flow from the burnout unit. Conduits through which the air and oxygen flow to the furnace combustion chamber can extend through the stack or flue to be heated by the exhaust flow before introduction to the furnace chamber. The invention also includes related methods.

10 Claims, 7 Drawing Sheets

| GLASS FURNACE TYPE | PROCESS POINT | | |
| --- | --- | --- | --- |
| | 1 | 2 | 3 |
| NOx(lb/ton) −FLAT | 14 | 1.4 | 0.84 |
| −CONTAINER SP | 9 | 0.9 | 0.54 |
| −CONTAINER EP | 7 | 0.7 | 0.42 |
| STOICHIOMETRIC RATIO | 1.02 | 0.95 | 1.1 |
| η (NOx REMOVAL EFFICIENCY WITH 100% OXY−FUEL) | 90% | 40% | 94% |

METHOD AND SYSTEM TO REDUCED $NO_x$ AND FUEL EMISSIONS FROM A FURNACE

BACKGROUND OF THE INVENTION

1. Field of the Invention

This invention is directed to apparatuses, systems and methods for reducing emissions of $NO_x$ and combustible fuel in the exhaust gas from furnaces used in glass furnace systems, metal smelters, boilers, heaters, incinerators, and kilns and the like, that operate at relatively high temperatures.

2. Description of the Related Art

'Acid rain' is a major problem in some areas of the world in which industrial emissions, generally from burning hydrocarbon fuels, react with gases in the atmosphere to produce acidic compounds which fall as rain and alter pH levels in the environment. The impact of acid rain can be observed in rural areas as the destruction of vast tracts of trees, and also in urban areas in which acid rain corrodes metal and concrete structures such as buildings. Acid rain has a significant impact on the world ecosystem, and causes the destruction of large amounts of natural resources and manmade structures every year.

Another recognized air-pollutant is unburned combustible gases that are emitted from furnaces, boilers, incinerators, kilns and the like. Such combustible gases have been identified as an important contributor to the degradation of air-quality in many, particularly urban, regions of the world.

$NO_x$ has been identified as an emission product that is one of the chief sources of acid rain. Generally, $NO_x$ is generated by the combustion of hydrocarbon fuel to produce the relatively high temperatures required in steel mills, power plants, petroleum refineries, metal smelters and glass furnaces. Several systems and techniques have been proposed to reduce the emission of $NO_x$ in such industries. For example, European Patent Application 0 599 548 A1 of Richard Quirk et al. published Jun. 1, 1994 (hereinafter, the "Quirk et al. application") proposes a method of operating a cross-fired regenerative glass furnace to purportedly minimize $NO_x$ emissions from the furnace. The Quirk et al. application proposes a first method in which combustible material in excess of that required for stoichiometric combustion is supplied to and combusted in the furnace. The combustible materials in the exhaust gases from the furnace flow through a regenerator and are reacted with sufficient air to reduce the level of $NO_x$ and combustible material in the exhaust gas from the furnace. This technique of adding air to the exhaust gas from the furnace in proximity to a regenerator is sometimes called 'overfiring' in furnace industries. In a second method of the Quirk et al. application, the conditions in the melting furnace are operated stoichiometrically and fuel is supplied to the exhaust gases, either through burners situated in the outlet port mouth region or by preexisting burners, as they leave the melting area and enter the regenerator furnace. The techniques of the Quirk et al. application are sometimes referred to as 'reburning' in this technology, and the area in which it is used, typically in the outlet port from a furnace, is termed the 'reburning zone'.

Although the methods of the Quirk et al. application are meritorious to an extent in reducing $NO_x$ and combustible material levels in the exhaust gas from a glass furnace, further reduction in the amount of furnace exhaust $NO_x$ and combustible material levels below those attainable with the methods of the Quirk at al. application would be desirable. Also, it would be desirable to reduce the relatively significant fuel penalty required by the methods of the Quirk et al. application.

Another method that is used in furnace industries to reduce the emission of $NO_x$ and combustible fuel from furnace emissions is known as the 'oxy-fuel' method. Representative examples of this technology are disclosed in "Oxygen Enriched Air/Natural Gas Burner System Development," by A. I. Dalton, Final Report (July 1984–September 1989), PB91-167510 reproduced by the U.S. Dept. of Commerce, National Technical Information Service, and "Use of Air/Oxy/Fuel Burners for Aluminum Dross Processing" by Phillips et al. published March 1993 in Industrial Heating. In the oxy-fuel method, pure oxygen, rather than air, is combusted with fuel in the furnace. Thus, because nitrogen is not appreciably present in the furnace because pure oxygen, rather than air, serves as the oxidant for the combustion reaction, $NO_x$ is not formed in significant amounts in a furnace using the oxy-fuel method. Also, in the presence of sufficient oxygen, the fuel in the furnace is combusted and thus is not emitted from the furnace as a fuel pollutant. Moreover, because nitrogen is not present to absorb heat generated in a furnace using the oxy-fuel method, temperatures in an oxy-fuel furnace are generally higher than other types of furnaces.

The oxy-fuel method has substantial merit in preventing the emission of $NO_x$ and fuel pollutants from a high-temperature furnace. However, the cost of the high-purity oxygen needed for the oxy-fuel method is a significant disadvantage of the method, and in most furnace industries, the oxy-fuel method is too costly to implement. Accordingly, an apparatus or method that could reduce the emission of $NO_x$ and fuel pollutant emission from a furnace with reasonable expense, would be highly desirable.

SUMMARY OF THE INVENTION

This invention overcomes the disadvantages of the prior art noted above. A system in accordance with this invention includes a furnace coupled to receive a fuel flow, an oxygen flow and an air flow for combustion in the furnace's chamber. The fuel flow, oxygen flow and the air flow are combusted in approximately stoichiometric proportions. The combustion of the fuel, air and oxygen flows in the furnace chamber generates heat at relatively high temperatures (i.e., above 2600 degrees Fahrenheit), temperatures at which $NO_x$ generally forms if nitrogen is present in the furnace's chamber. The system also includes a port having an end coupled to the furnace to receive the exhaust flow from the furnace. The port is also coupled to receive a fuel flow that is added to the exhaust flow at a temperature above 2200 degrees Fahrenheit to react with and lower the amount of $NO_x$ present in the exhaust gas flow from the furnace chamber. Preferably, the fuel flow is added to the exhaust flow in a proportion that is fuel-rich with a stoichiometric ratio from 0.85 to 0.99. To diminish the presence of fuel in the exhaust flow from the port that would otherwise be emitted from the furnace as a pollutant, an oxidant flow including air and/or oxygen, is added to the exhaust gas flow in a burnout unit of the furnace system of this invention. The burnout unit can be a regenerator or recuperator if the furnace has exhaust heat recovery, in which case the regenerator or recuperator is coupled to receive the oxidant flow that is added to the exhaust flow, at the entrance of the regenerator or recuperator. By adding the oxidant flow to the entrance to the regenerator or recuperator, the heat generated by the combustion of the fuel and oxidant flows can be used to heat the regenerator or recuperator. Alternatively, the burnout unit can be a burnout reactor coupled to receive the exhaust flow from the port, and coupled to receive the oxidant flow. The burnout reactor preferably has a refractory-lined chamber in which the oxidant flow can be added and combusted with the exhaust flow. Downstream of or at the exit of the burnout unit, a coolant flow, preferably of ambient air, can be added to the exhaust flow to combust any remaining fuel in the exhaust and also to cool the exhaust to a temperature at which the exhaust is not significantly reactive. If the burnout unit is a regenerator, the coolant flow can be added to the exhaust flow at the exit of the regenerator, for example. The system of this invention can also include a recuperator coupled to receive the oxygen and air flows, for heating the oxygen and air flows supplied to the furnace. The recuperator can be installed in a stack or flue that is coupled to the port to receive the exhaust flow. Conduits that receive respective air and oxygen flows, extend through the stack or flue so that the exhaust flow transfers heat to the air and oxygen flows before they are introduced to the furnace chamber.

A method in accordance with this invention includes steps of adding fuel, air and oxygen flows in approximately stoichiometric proportions, and combusting the fuel, air and oxygen flows in the chamber to generate heat and an exhaust flow with a temperature above 2600 degrees Fahrenheit at which the nitrogen present in the air will cause the undesirable generation of $NO_x$ as a by-product of the combustion reaction that generates heat in the furnace. The method also includes a step of receiving the exhaust flow in an elongated port communicating with the chamber. The method also includes a step of adding a fuel flow to the exhaust flow in the port at a position along the port at which the temperature of the exhaust gas flow has not cooled below 2200 degrees Fahrenheit. Preferably, the adding of the fuel flow to the exhaust flow in the port is performed in a proportion that produces a fuel-rich mixture with a stoichiometric ratio of fuel to other reactants in a range from 0.85 to 0.99. The method can also include a step of adding an oxidant flow to the exhaust flow, preferably at a temperature above 1500 degrees Fahrenheit, to produce an oxidizer-rich mixture with a stoichiometric ratio of oxidizer to fuel above 1.0 to combust fuel in the exhaust flow.

Advantageously, the system and method of this invention achieve a reduction in operating cost relative to the prior art oxy-fuel method, by adding air to dilute relatively expensive oxygen. The air and oxygen are together used as the oxidizer for the combustion of the fuel in the furnace chamber, rather than using pure oxygen alone as done in the oxy-fuel method. Although the presence of nitrogen in the air added to the oxygen will produce $NO_x$, the amount of $NO_x$ generated by the furnace can be controlled by controlling the proportion of air to oxygen, and by operating the furnace chamber at approximately stoichiometric conditions. Any $NO_x$ generated in the furnace chamber travels in the exhaust flow from the furnace chamber to which is added a fuel flow to cause a reduction reaction to significantly reduce the amount of $NO_x$ in the exhaust flow. After reducing the $NO_x$ in the exhaust flow, any extraneous fuel in the exhaust flow is combusted with an oxidant flow including oxygen and/or air, to prevent its emission into the atmosphere as a pollutant. Thus, the invention achieves significantly reduced emissions of $NO_x$ and fuel from high-temperature furnaces at a reasonable expense by reducing the consumption and thus cost of the oxygen supply used by the method and system of the invention. The invention can also be used to increase the production rate of existing furnaces without impacting the $NO_x$ emissions.

These together with other objects and advantages, which will become subsequently apparent, reside in the details of construction and operation as more fully hereinafter described and claimed, reference being made to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

DESCRIPTION OF THE PREFERRED EMBODIMENTS

Figure 1:
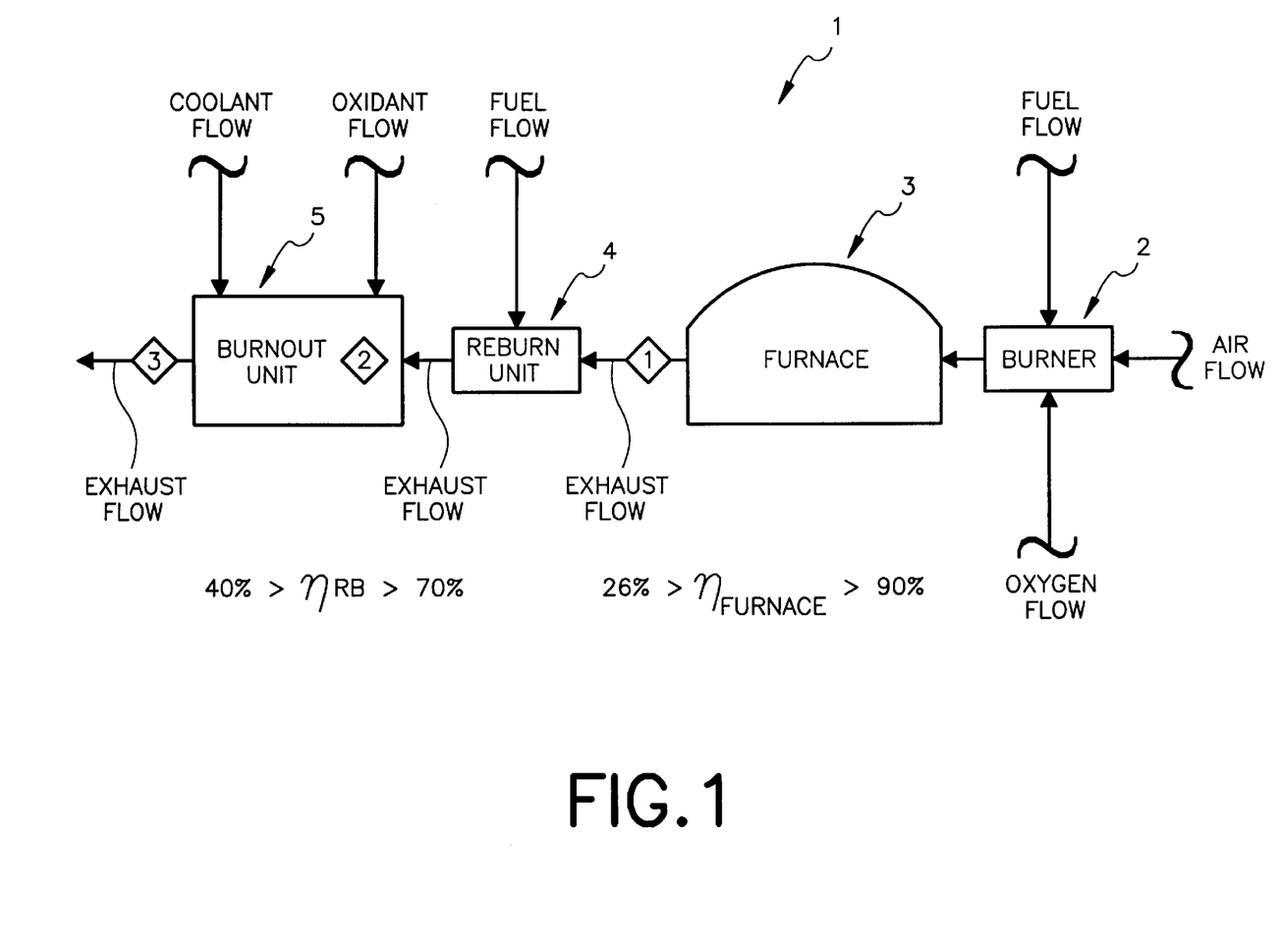
FIG. 1 is a diagrammatic view of a furnace system in accordance with this invention.

In FIG. 1, a furnace system 1 of this invention includes a burner 2 coupled to receive air, oxygen and fuel flows via respective conduits (not shown in FIG. 1). Preferably, the fuel is a hydrocarbon gas such as natural gas, but can as well be other types of fossil or even nonfossil fuel. In the burner 2, the air, oxygen and fuel flows are added together and expelled from an outlet of the burner 2 into a chamber of a furnace 3 in which the air, oxygen and fuel are combusted. Preferably, the adding together and combustion of the fuel, oxygen and air flows is performed in the furnace 3 so that the proportion of oxidizer to fuel is approximately stoichiometric. Due to the presence of nitrogen in the air flow, $NO_x$ will form to a degree in the furnace chamber if temperatures in the furnace are above 2600 degrees Fahrenheit. However, the generation of $NO_x$ in the furnace 3 is limited to a degree in proportion to the amount of oxygen present in the air and oxygen flows, as can be seen in the graph of FIG. 2.

Figure 2:
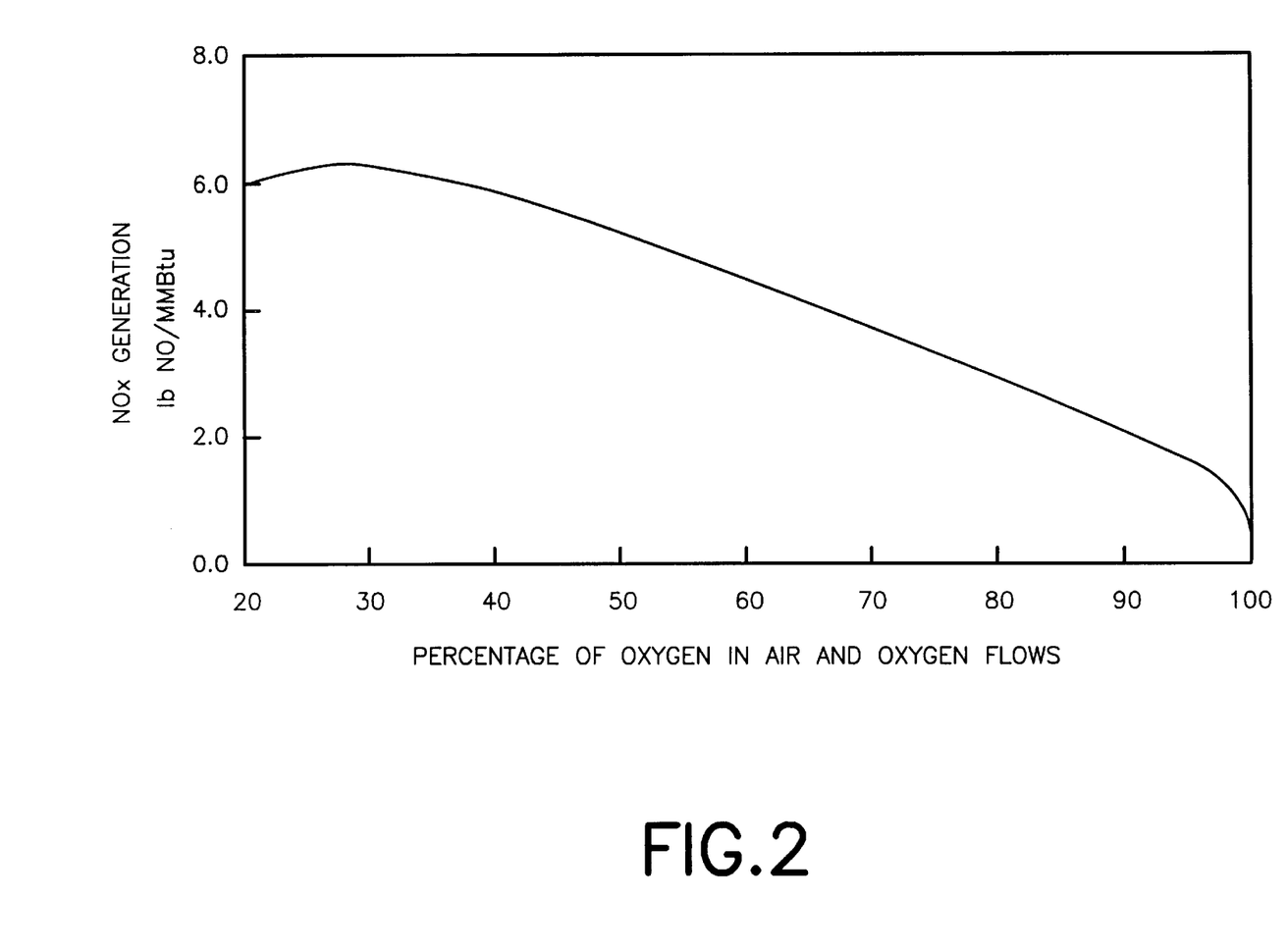
FIG. 2 is a graph of $NO_x$ generation versus oxygen content in the oxidizer used to combust fuel.

FIG. 2 is a graph showing a typical relationship between the amount of $NO_x$ generated by combustion in a furnace as a function of the percentage of oxygen in the added air and oxygen flows. The actual form of this curve will depend upon burner and furnace design specifics. Usually, the $NO_x$ content will be maximum at about 35% of oxygen in the oxidant. The maximum values of $NO_x$ with oxygen included in the oxidant can be up to twice the $NO_x$ emissions with air only. As indicated in FIG. 2, at an oxygen content above 35%, the more oxygen that is present in the air and oxygen flows, the less $NO_x$ that will be generated when the fuel, air and oxygen flows are combusted in the furnace 3. In the prior art oxy-fuel method previously explained, combustion of fuel with pure oxygen generates no appreciable $NO_x$. However, operation with pure oxygen is prohibitively expensive for most furnaces. In accordance with this invention, the expense associated with oxygen is reduced by adding air to the oxygen in a proportion that generates $NO_x$ in an amount that can be reduced to a predetermined tolerable level downstream from the furnace 3 relative to the direction of exhaust flow.

To this end, the furnace system 1 of this invention includes a reburn unit 4 that can be a port, for example, that is an elongated conduit or passageway coupled to communicate with the chamber of the furnace 3. The reburn unit 4 receives an exhaust flow generated by the combustion of the fuel, air and oxygen flows in the furnace chamber. The reburn unit 4 is coupled to communicate with a conduit (not shown in FIG. 1) that receives and guides a fuel flow into the reburn unit 4. The fuel flow into the reburn unit 4 can be a hydrocarbon gas such as natural gas, or other types of fossil or nonfossil fuel. Preferably, this fuel flow is natural gas added to the exhaust flow in the reburn unit 4 at a temperature above 2200 degrees Fahrenheit, causing a reaction that significantly lowers the amount of $NO_x$ in the exhaust flow. The fuel flow is preferably added to the exhaust flow in the reburn unit 4 in a proportion that is fuel-rich with a stoichiometric ratio of non-fuel to fuel reactants in a range from 0.85 to 0.99.

Figure 3:
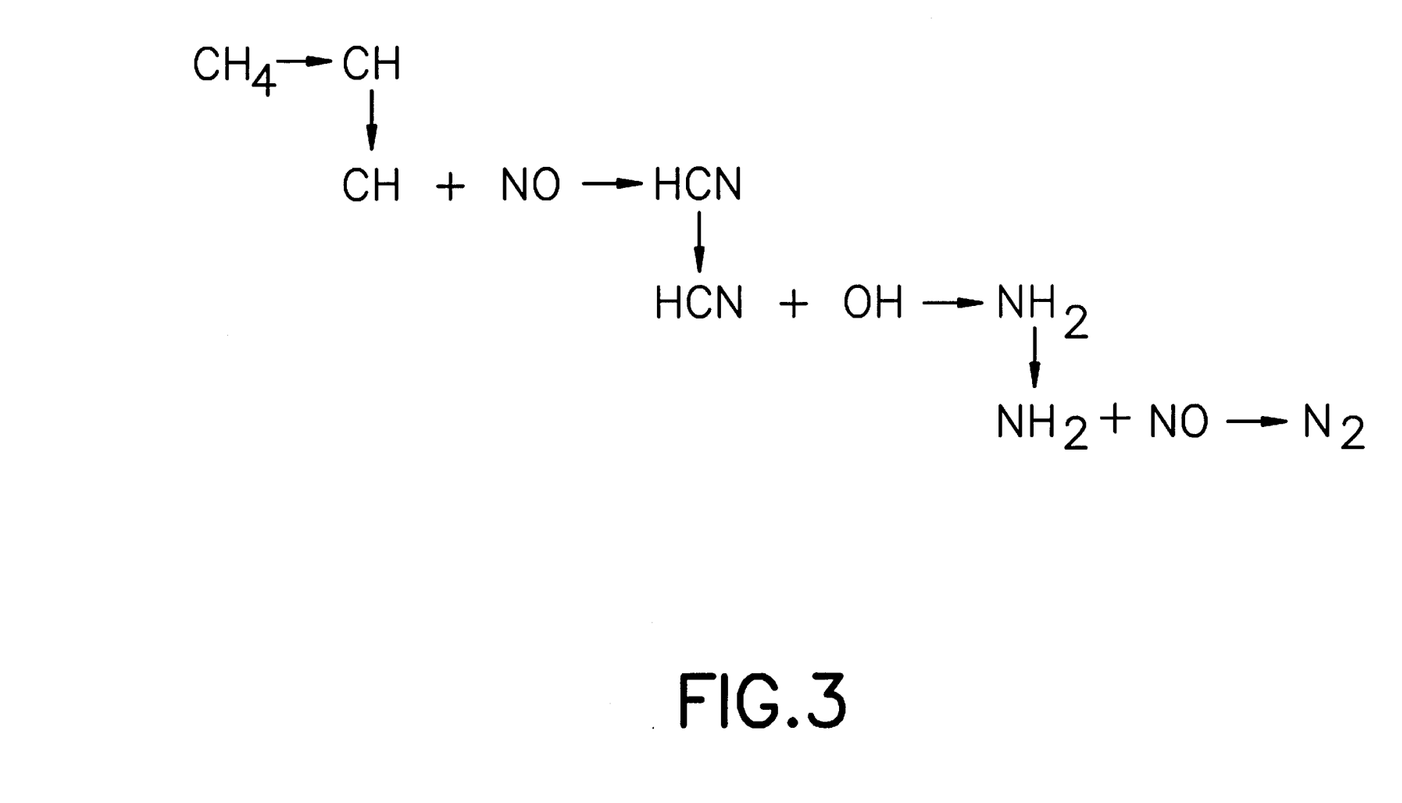
FIG. 3 is a flow chart of a reaction sequence for reducing $NO_x$ with a hydrocarbon fuel.

In FIG. 3, the reaction caused by the addition of the fuel flow, in this case natural gas, and the exhaust flow at a temperature above 2200 degrees Fahrenheit, is shown. Specifically, methane ($CH_4$) in the natural gas fuel breaks down in the heat of the exhaust gas to hydrocarbon fragments (CH) which react with NO to produce intermediate species (HCN). The intermediate species (HCN) react with an OH group to generate $NH_2$. The $NH_2$ further reacts with NO to generate molecular nitrogen ($N_2$). $NO_x$ is thus consumed in the reaction of FIG. 3.

An outlet of the reburn unit 4 is coupled to the inlet of a burnout unit 5. The burnout unit 5 can be a regenerator in a regenerative variety of furnace, or, in accordance with this invention, can be a burnout reactor with a refractory-lined chamber. The burnout unit 5 is coupled to receive the exhaust flow from the reburn unit 4, and is also coupled via a conduit or the like to receive an oxidant flow that includes air and/or oxygen. If the burnout unit 5 is a regenerator, the conduit supplying the oxidant flow preferably communicates and delivers the oxidant flow to an entrance end of the regenerator so that the combustion reaction of the oxidant flow with the fuel in the exhaust flow generates heat that can be transferred to the regenerator. If the burnout unit 5 is a burnout reactor, the oxidant flow is preferably added to the exhaust gas in the burnout reactor at a position sufficiently upstream along the path of the exhaust flow that the combustion flame will be substantially contained within the refractory-lined chamber of the burnout reactor.

Optionally, the burnout unit 5 can also be coupled to a conduit or the like to receive a coolant flow that is added to the exhaust flow in the burnout unit 5 at a point downstream along the exhaust flow path from the point at which the burnout unit receives the oxidant flow. The coolant flow can be relatively low-temperature ambient air that is added to the exhaust flow to cool the exhaust flow to a temperature at which the exhaust flow is no longer significantly reactive. If the burnout unit 5 is a regenerator, the conduit guiding the coolant flow is preferably coupled in near proximity to the exit end of the regenerator from which the exhaust flow is expelled from the regenerator. On the other hand, if the burnout unit 5 is a burnout reactor, the conduit that guides the air flow can be coupled to the refractory-lined chamber in near proximity to the exit thereof from which the exhaust flow is expelled. An exit end of the burnout unit 5 is coupled to a conduit or the like that guides the exhaust flow to a stack or flue or the like (not shown in FIG. 1) for emission to the atmosphere. If the burnout unit 5 is implemented as a burnout reactor, the conduit is coupled between the exit end of the burnout reactor and the stack or flue. On the other hand, if the burnout unit 5 is a regenerator, the conduit is coupled between the exit end of the regenerator and the stack or flue.

As an option, the respective conduits that guide the air and oxygen flows to the furnace 3 can be joined so that the air and oxygen are added together and guided in a single common pre-heat exchanger (i.e., a recuperator) mounted to extend through the stack. The exhaust gas in the stack moving past the conduit heats the oxygen and air before introduction to the furnace 3. The heating of the air and oxygen flows to the furnace 3 raises the heat temperatures attainable with the furnace 3. The heating of the added air and oxygen flows should only be done at oxygen concentrations at or below 60% by volume of the added air and oxygen flows and at a temperature below about 900 degrees Fahrenheit, because there is a risk that the oxygen may combust in the conduit when heated if the oxygen is present in the added air and oxygen flows in an amount greater than about 60% by volume.

Figure 4:
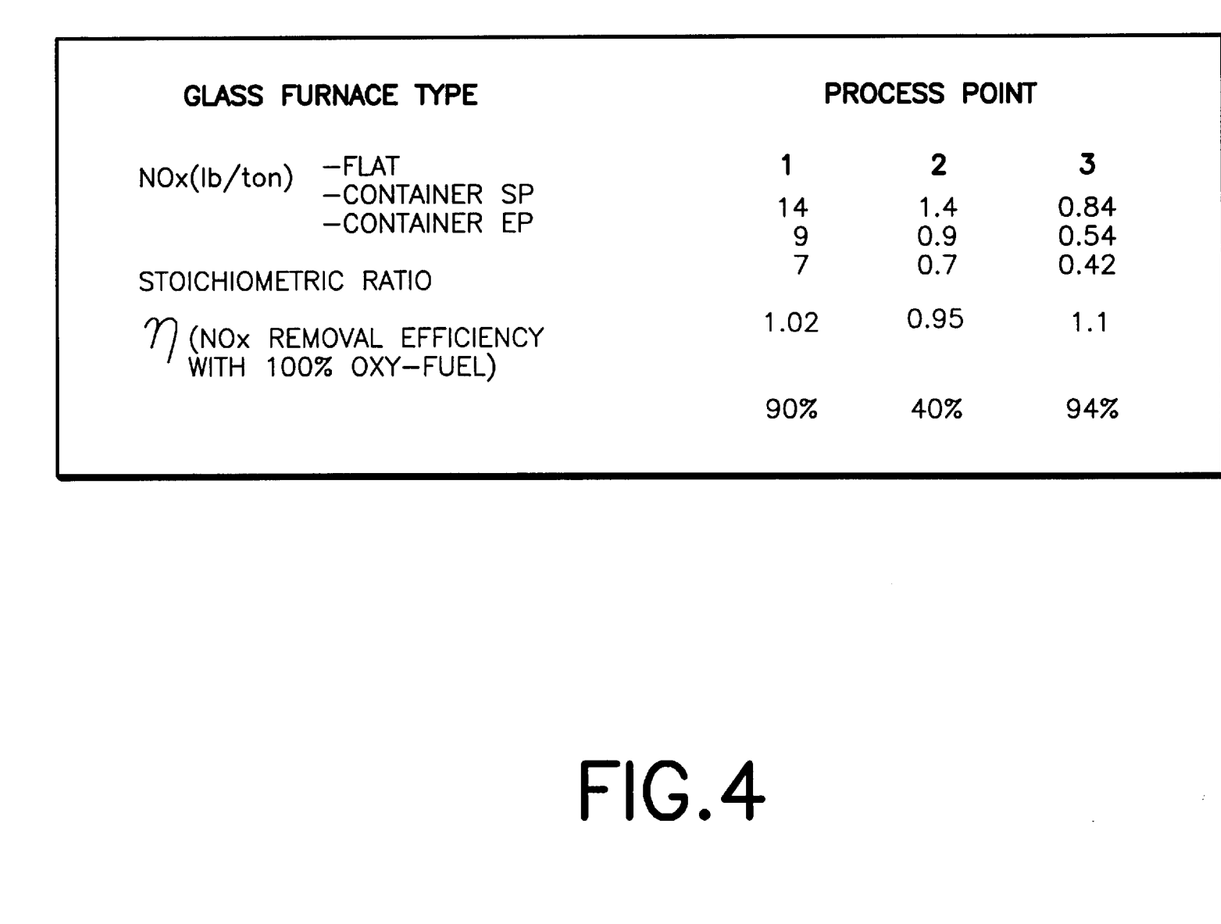
FIG. 4 is a table showing $NO_x$ content of flows at selected process points in the furnace system of FIG. 1 for different types of glass furnaces.

FIG. 4 is a table listing $NO_x$ concentration amounts in pounds (lbs.) of $NO_2$ generated per ton of glass at process points indicated by the numbered diamonds 1, 2 and 3 in the furnace system 1 of FIG. 1 for three different types of glass furnaces: flat glass, side port configuration; container glass, side port configuration; and container glass, end port configuration. The operating conditions for these furnaces are typical of furnaces found in commercial service, usually with port exhaust temperatures greater than about 2800 degrees Fahrenheit. At process point 1, the exhaust flow is assumed to have a proportion of oxidizer to fuel with a stoichiometric ratio of 1.02, and thus is nearly stoichiometric. At process point 2, the oxidant flow is added to the exhaust gas at a stoichiometric ratio of oxidizer to fuel of 0.95 that is thus fuel-rich. At process point 3, the air flow added to the exhaust flow increases the stoichiometric ratio of oxidizer to fuel of 1.1, and thus is oxidizer-rich.

Also, FIG. 4 shows ratios of the $NO_x$ removal efficiency (that is, the ratio of the amount of outgoing $NO_x$ to the amount of incoming $NO_x$) at the process points 1, 2 and 3.

Figure 5:
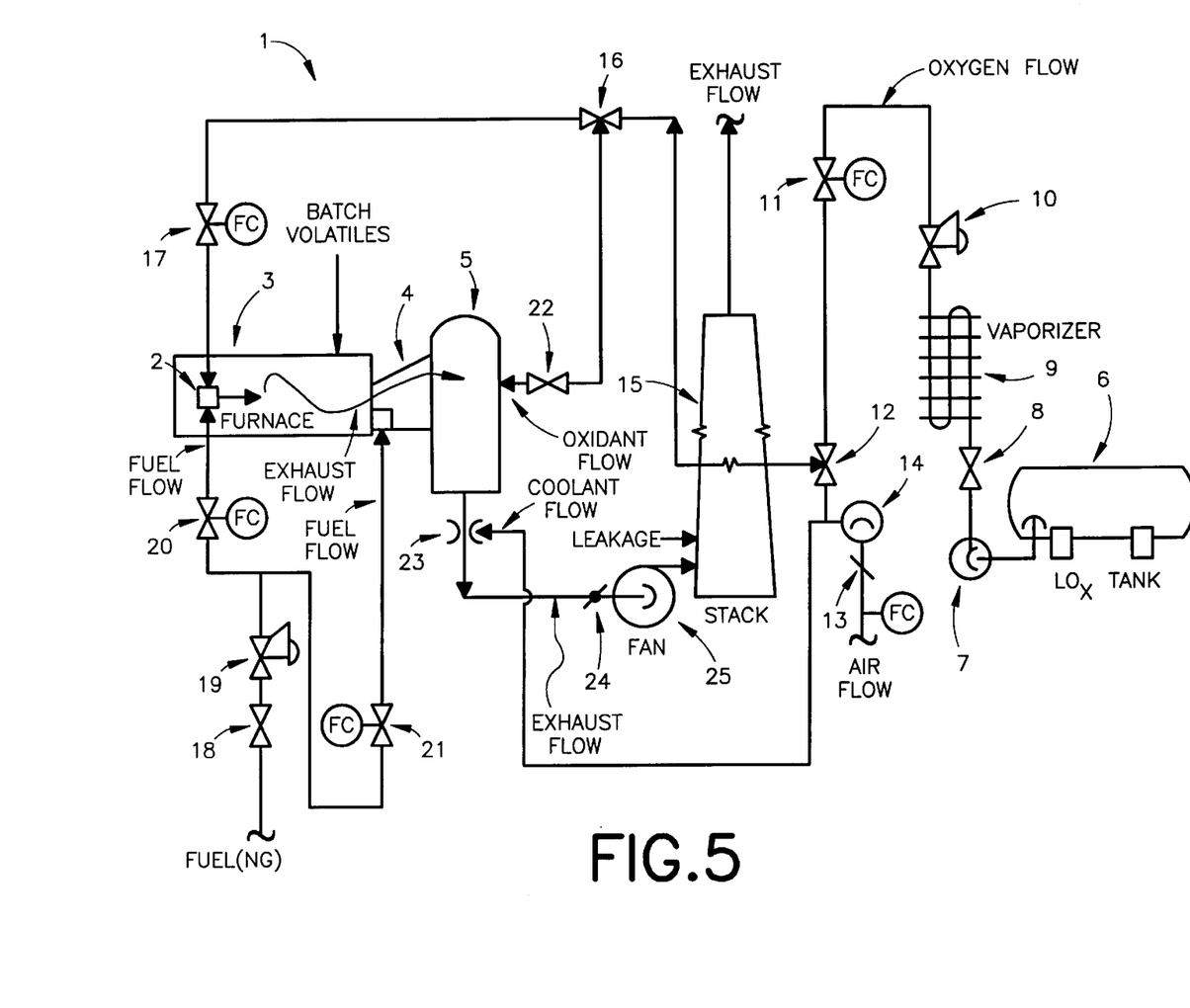
FIG. 5 is a diagram of an exemplary preferred embodiment of the furnace system of this invention.

In FIG. 5, the furnace system 1 of this invention is realized as a regenerative side-port furnace in one exemplary preferred embodiment of this invention. An oxygen tank 6 stores liquid oxygen. In operation of the furnace system 1, a pump 7 is coupled via a conduit to receive the liquid oxygen from the oxygen tank 6. The outlet side of the pump 7 is coupled to a valve 8 that serves as an emergency shut-off valve for the furnace system 1. In normal operation, the valve 8 is open to allow the liquid oxygen to flow therethrough. The outlet end of the valve 8 is coupled to a vaporizer 9 that heats the liquid oxygen to cause the liquid oxygen to vaporize. A pressure regulator 10 is coupled via a conduit to the vaporizer 9 and pressurizes the vaporized oxygen to drive the oxygen through a conduit coupled between the regulator 10 and a flow control valve 11. The control valve 11 is electrically coupled to receive a control signal from a flow controller (not shown). Based on the control signal from the flow controller, the control valve 11 controls the rate of flow of the compressed oxygen therethrough. The outlet of the control valve 11 is coupled via a conduit to one of two inlets of the three-way mixing valve 12.

An air flow, such as ambient air, is received through a damper 13 in a conduit. The damper 13 controls the rate of flow of the air through the conduit. The damper 13 is also coupled via a conduit to communicate with an inlet of a fan 14 that has an outlet coupled to the other inlet of the three-way mixing valve 12. The air and oxygen flows are added together at the three-way mixing valve 12 and travel via a common conduit that is mounted to extend through a stack 15. The stack 15 receives the exhaust flow from the furnace 3 that is at a relatively high temperature. The exhaust flow moves past the outer surface of the conduit extending from the outlet side of the three-way mixing valve 12, to heat the added air and oxygen flows in the conduit. The heated air and oxygen flows move through the conduit that is coupled to an inlet side of a three-way valve 16 that has two outlets. Through one outlet, the heated air and oxygen flow travels through a conduit to an inlet side of a control valve 17. The control valve 17 is electrically coupled to receive a control signal from the flow controller. Based on the control signal, the valve 17 controls the rate of flow of the added oxygen and air therethrough. The outlet side of the control valve 17 is coupled to the burner port 2 inside of the furnace 3 where it is added to and combusted with the fuel flow.

The fuel, in this case natural gas (designated "NG" in FIG. 5), flows from a supply line into an inlet side of the valve 18 via a conduit. The outlet side of the valve 18 communicates with a conduit that is coupled in communication with the inlet side of a regulator 19. The valve 18 serves as an emergency shut-off valve to cut-off the fuel flow in the event of an emergency, but in the normal, non-emergency case, the valve 18 is opened to a degree to allow the fuel to flow therethrough. The regulator 19 pressurizes the fuel flow, and has an outlet coupled via a conduit to an inlet of a control valve 20. The control valve 20 is electrically coupled to receive a control signal from the flow controller. Based on the signal from the flow controller, the control valve controls the rate of the fuel flow therethrough. The control valve 20 has an outlet side coupled via a conduit to the burner port 2 where the fuel flow is added to the air and oxygen flows and is combusted in the furnace 3, thus generating heat and the exhaust flow.

The fuel supply line is also coupled via a conduit to an inlet of a control valve 21. The control valve 21 is also coupled to receive a control signal from the flow controller. Based on the control signal from the flow controller, the control valve 21 controls the rate of flow of the fuel through the valve 21. An outlet side of the control valve 21 is coupled via a conduit to the reburn unit 4 (that is a port in FIG. 5) where the fuel flow is added to the exhaust flow for reburning in the burnout unit 5 (in FIG. 5, the burnout unit 5 is a regenerator).

The other outlet from the three-way valve 16 is coupled via a conduit to the single inlet side of a flow control valve 22. In the furnace system 1 of FIG. 5, the outlet of the valve 22 is coupled via a conduit to the entrance of the regenerator 5 where it is added as the oxidant flow to the exhaust flow to reburn fuel in the exhaust flow.

A conduit couples the end of the regenerator 5 to a damper 24 that controls the direction of the fuel, air and oxygen and exhaust flows through the regenerator to periodically switch between firing and exhaust sides of the regenerative furnace system 1 in a manner well-known to those of ordinary skill in this art. An outlet end of the damper 24 communicates with a conduit that guides the exhaust flow to an inlet side of a fan 25. The fan 25 has an outlet side coupled to the stack 15 via a conduit. The fan 25 drives the exhaust into the stack 15 where it flows past and heats the added oxygen and air flows in the conduit (i.e., recuperator) running between the three-way mixing valve 12 and the three-way valve 16. The exhaust flow is emitted to the atmosphere from the stack 15.

The flow controller is programmed to generate control signals supplied to the respective control valves 11, 17, 20, 21 to control flow rates of the air and oxygen flows and the fuel flows so that these flows are appropriately added together, preferably in proportions according to the stoichiometric ratios previously described with respect to the furnace system 1 in FIG. 1. For example, the flow controller can be a suitable computer or programmable controller or the like.

Figure 6A:
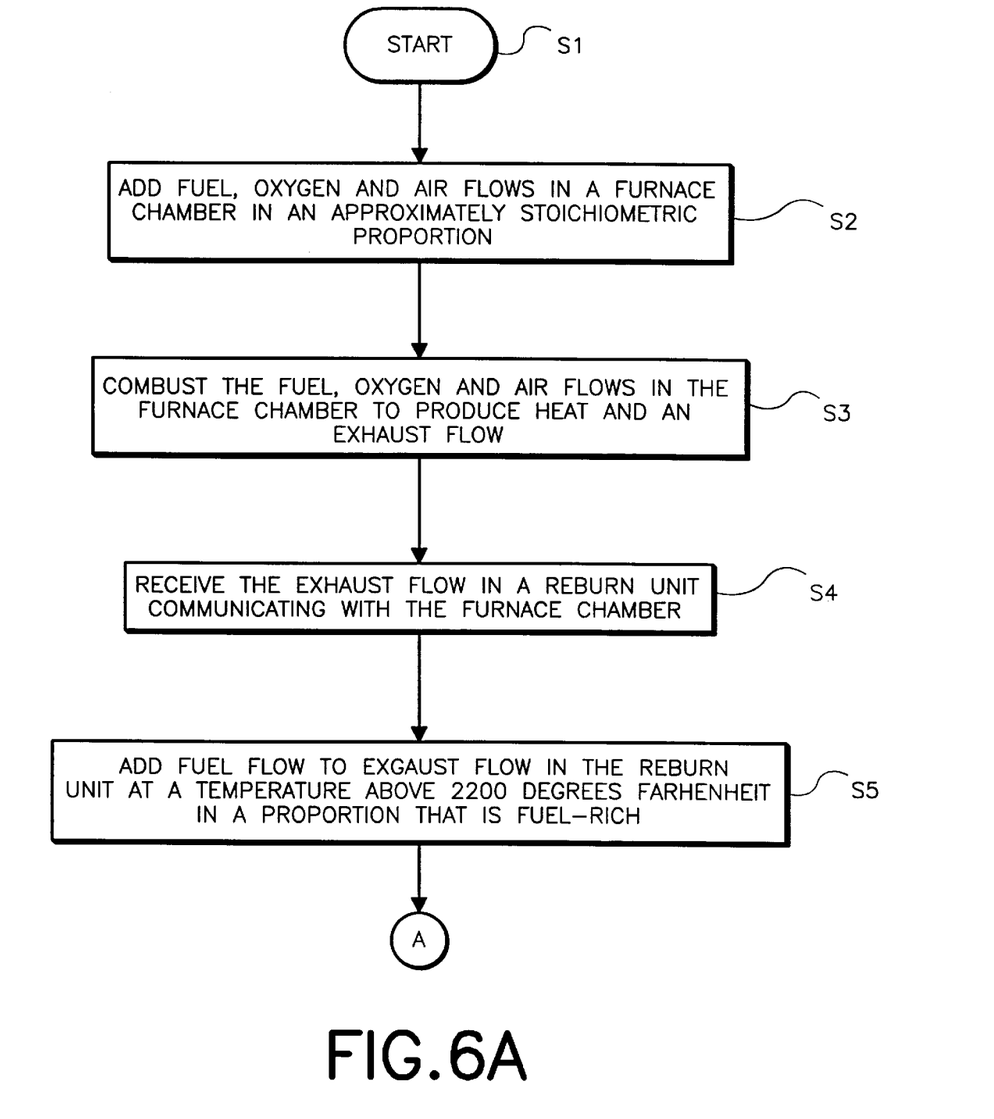
FIGS. 6A and 6B are flow charts of a method in accordance with this invention.
Figure 6B:
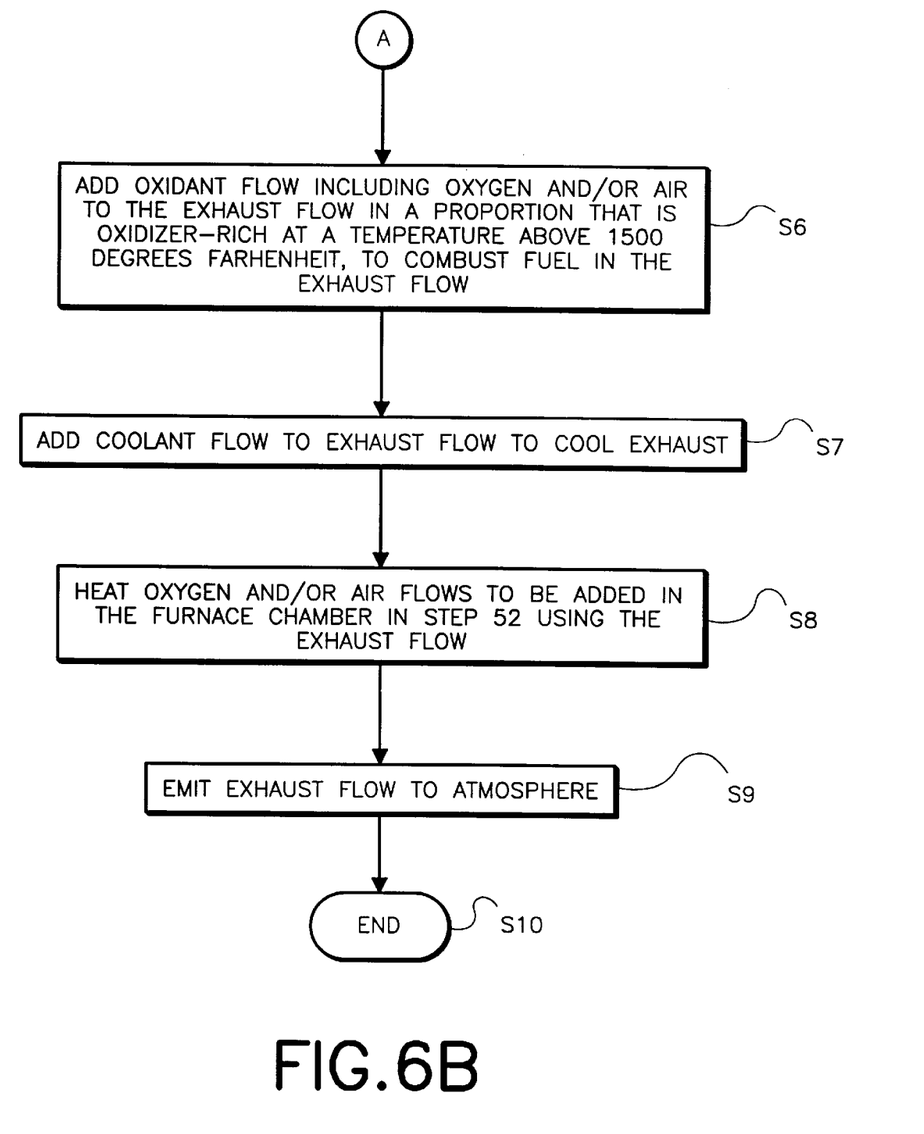

In FIGS. 6A and 6B, a method in accordance with this invention starts in step S1. In step S2, fuel, oxygen and air flows are added together in a chamber of the furnace 3 at a nearly stoichiometric proportion of reactants. In step S3, the fuel, oxygen and air flows are combusted in the furnace chamber to generate heat and an exhaust flow. Advantageously, the use of costly oxygen is reduced in the method of FIGS. 6A and 6B by using air as a portion of the oxidizer for the combustion reaction, and combustion of the reactants at near stoichiometric conditions reduces the generation of $NO_x$. In step S4, the exhaust flow is received in a reburn unit (that can be a port) that communicates with the furnace chamber. In step S5, a fuel flow is added to the exhaust flow in the reburn unit preferably at a temperature above 2200 degrees Fahrenheit in a proportion that is fuel-rich, with a stoichiometric ratio in a range from 0.85 to 0.99, for example. The adding together of the fuel and exhaust flows together in step S5 significantly lowers the amount of $NO_x$ in the exhaust flow primarily by the reaction shown in FIG. 3. In step S6 of FIG. 6B, an oxidant flow including oxygen and/or air, is added to the exhaust flow in a proportion that is preferably oxidizer-rich, to combust the fuel in the exhaust flow so that this fuel is not emitted from the furnace 3 as a pollutant. Optionally, in step S7, a coolant flow that can include air, is added to the exhaust flow to cool the exhaust to a temperature at which the exhaust flow is not significantly reactive. As a further option, in step S8, the exhaust flow heats oxygen and/or air flows that are to be added with the fuel flow for combustion in the chamber of the furnace 3. In step S9, the exhaust flow is emitted to the atmosphere and, in step S10, the method of FIGS. 6A and 6B ends.

Although the invention has been described with specific illustrations and embodiments, it will be clear to those of ordinary skill in the art that various modifications may be made therein without departing from the spirit and scope of this invention as outlined in the following claims. For example, the proportion of air and oxygen mixed for combustion by the burner 2 will vary depending upon the design of the furnace system in which the invention described herein is implemented. The proportion of air to oxygen combusted by the burner 2 is preferably selected to improve the furnace efficiency and productivity while decreasing system flow rates and therefore the consumption of relatively expensive oxygen and fuel. Preferably, the reburn fuel is added to the furnace exhaust in sufficient quantity to lower the emission of $NO_x$ to meet regulations or, in a situation in which an existing furnace is modified, to control $NO_x$ emissions from the modified furnace to a level that does not exceed the emission of $NO_x$ from the furnace before the modification, for example. These modifications and variations are intended to be within the scope of this invention as claimed hereinafter.

I claim:

1. A method applied to a furnace receiving first and second fuel flows, and air and oxygen flows, the method comprising the steps of:

a) in a chamber of the furnace, adding the first fuel flow, an air flow, and an oxygen flow in approximately stoichiometric proportions;

b) combusting the first fuel flow, the air flow, and the oxygen flow in the chamber to generate heat and an exhaust flow;

c) receiving the exhaust flow in a reburn unit in fluid communication with the chamber, the exhaust flow cooling as the exhaust flow travels through the reburn unit;

d) adding the second fuel flow to the exhaust flow in the reburn unit at a position along the reburn unit at which the temperature of the exhaust gas flow has not cooled below 2200 degrees Fahrenheit, the adding of the second fuel flow to the exhaust flow producing a fuel-rich mixture; and e) downstream relative to the direction of the exhaust adding an oxidant flow to the exhaust flow in a burnout unit in fluid communication with the return unit to produce an oxidizer-rich mixture with a stoichiometric ratio above 1.0 to combust fuel in the exhaust flow, wherein the oxidant comprises a mixture of air and oxygen gas.

2. A method as claimed in claim 1, further comprising the step of, downstream relative to the direction of the exhaust flow from a position along the path of the exhaust flow where said step (e) is performed, adding a coolant flow to the exhaust flow to cool the exhaust flow.

3. A method as claimed in claim 2, wherein the coolant flow includes air.

4. A method as claimed in claim 1, further comprising the step of:

g) heating at least one of the air and oxygen flows supplied to the furnace chamber for use in performing said step (a).

5. The method of claim 1, wherein the oxidant flow is added to the exhaust flow in a burnout unit that is in fluid communication with the reburn unit, the exhaust flow traveling through the burnout unit from an entrance end to an exit end of the burnout unit.

6. The method of claim 5, wherein the burnout unit is a regenerator and the oxidant flow is added to the exhaust flow adjacent the entrance end of the regenerator.

7. The method of claim 5, wherein the burnout unit is a recuperator and the oxidant flow is added to the exhaust flow adjacent the entrance end of the recuperator.

8. The method of claim 1, wherein the exhaust flow leaves the furnace at a temperature above 2600 degrees Fahrenheit.

9. The method of claim 8, wherein the fuel-rich mixture resulting from the addition of the second fuel flow to the exhaust flow has a stoichiometric ratio of non-fuel reactants to fuel in a range from 0.85 to 0.99.

10. The method of claim 9, wherein the oxidant flow is added to the exhaust flow at a temperature above 1500 degrees Fahrenheit.

* * * * *